(12) United States Patent
Bruce et al.

(10) Patent No.: US 7,965,500 B1
(45) Date of Patent: Jun. 21, 2011

(54) SYSTEM, METHOD AND APPARATUS FOR USING OVERMOLDED DAMPENERS TO ABSORB SHOCK AND VIBRATION

(75) Inventors: Brian Bruce, Austin, TX (US); Ahmad Chamseddine, Round Rock, TX (US)

(73) Assignee: Augmentix Corporation, Austin, TX (US)

( * ) Notice: Subject to any disclaimer, the term of this patent is extended or adjusted under 35 U.S.C. 154(b) by 160 days.

(21) Appl. No.: 12/204,579

(22) Filed: Sep. 4, 2008

Related U.S. Application Data

(60) Provisional application No. 60/967,355, filed on Sep. 4, 2007.

(51) Int. Cl.
  H05K 7/00 (2006.01)
  H05K 5/00 (2006.01)
  H04M 1/00 (2006.01)
  B65D 1/40 (2006.01)
  A47B 95/00 (2006.01)

(52) U.S. Cl. ......... 361/679.34; 361/679.35; 361/679.36; 361/679.55; 455/575.1; 220/732; 248/345.1

(58) Field of Classification Search ............ 361/679.01–679.61; 321/223.1, 321/223.2, 331; 206/305, 320, 523, 576
See application file for complete search history.

(56) References Cited

U.S. PATENT DOCUMENTS

| 5,401,091 | A | * | 3/1995 | Landry | 312/223.1 |
| 5,623,390 | A | * | 4/1997 | Noda et al. | 361/679.02 |
| 6,532,152 | B1 | * | 3/2003 | White et al. | 361/692 |
| 2002/0044406 | A1 | * | 4/2002 | Shimoda et al. | 361/679 |
| 2004/0027796 | A1 | * | 2/2004 | Shih et al. | 361/683 |
| 2004/0102232 | A1 | * | 5/2004 | Nuovo | 455/575.1 |
| 2007/0247793 | A1 | * | 10/2007 | Carnevali | 361/681 |

* cited by examiner

*Primary Examiner* — Robert J Hoffberg
*Assistant Examiner* — Jerry Wu
(74) *Attorney, Agent, or Firm* — Sprinkle IP Law Group (57) ABSTRACT

A computer chassis has overmolded dampeners for absorbing shock and vibration. Electronic components are hard mounted to points inside the computer chassis. Overmolded dampeners are affixed to corners, surfaces and sides of the laptop such that shock and vibration are absorbed by the dampeners before the shock or vibration can damage the electronic components. Affixing dampeners to portions of the chassis may provide shock and vibration protection with minimal weight.

14 Claims, 7 Drawing Sheets

SYSTEM, METHOD AND APPARATUS FOR USING OVERMOLDED DAMPENERS TO ABSORB SHOCK AND VIBRATION

RELATED APPLICATIONS

This application claims priority under 35 U.S.C. §119(e) to U.S. Provisional Patent Application No. 60/967,355, entitled "System, Method and Apparatus for Using Overmolded Dampeners to Absorb Shock and Vibration" by Bruce, et al., filed on Sep. 4, 2007, which is hereby fully incorporated by reference herein.

TECHNICAL FIELD OF THE DISCLOSURE

The present disclosure generally relates to mobile computers and other portable or handheld devices and in particular to using overmolded dampeners to dampen shock and vibration.

BACKGROUND OF THE DISCLOSURE

Modern handhelds and mobile computers are used in harsh or extreme environments and may be exposed to shock and vibration from contact with other objects or by accidental drops.

SUMMARY OF THE DISCLOSURE

Embodiments of a computer may have overmolded dampeners to absorb shock and vibration.

One embodiment of a method for dampening a mobile computer may include hard mounting components to the computer chassis and affixing dampeners to the identified areas of the chassis. Some embodiments may include the steps of determining the dampening requirements for the computer and identifying areas of the computer on which dampening material may be affixed. The step of determining the dampening requirements of the computer may also involve identifying the maximum shock or vibration that a critical component may withstand before failure.

Other objects and advantages of the embodiments disclosed herein will be better appreciated and understood when considered in conjunction with the following description and the accompanying drawings.

BRIEF DESCRIPTION OF THE DRAWINGS

A more complete understanding of the present disclosure and the advantages thereof may be acquired by referring to the following description, taken in conjunction with the accompanying drawings in which like reference numbers indicate like features and wherein.

DETAILED DESCRIPTION

The inventive system, method and apparatus for using overmolded dampeners to absorb shock and vibration and the various features and advantageous details thereof are explained more fully with reference to the non-limiting embodiments detailed in the following description. Descriptions of well known starting materials, manufacturing techniques, components and equipment are omitted so as not to unnecessarily obscure the disclosure in detail. Skilled artisans should understand, however, that the detailed description and the specific examples, while disclosing preferred embodiments of the disclosure, are given by way of illustration only and not by way of limitation. Various substitutions, modifications, and additions within the scope of the underlying inventive concept(s) will become apparent to those skilled in the art after reading this disclosure. Skilled artisans can also appreciate that the drawings disclosed herein are not necessarily drawn to scale.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements, but may include other elements not expressly listed or inherent to such process, article, or apparatus. Further, unless expressly stated to the contrary, "or" refers to an inclusive "or" and not to an exclusive "or". For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to a particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Embodiments described herein may be useful for constructing a rugged computer that can withstand harsh and extreme conditions. Computers, particularly laptop computers, are used by the military, commercial and individuals in situations in which the computer may be dropped, may encounter vibration for periods of time, may be exposed to rain, dust, salt water environments or high humidity environments, and the like.

In a system for dampening shock and vibration, electronic components such as a motherboard, a hard drive, an optical disk drive, and the like, which are traditionally dampened individually, may be hard mounted to the base chassis for a laptop computer. Individually dampening each electronic component increases the complexity of dampening the computer. For example, individually dampening each component raises the possibility that a resonance vibration from nearby components may damage an electronic component. Thus, individually dampened components may still be damaged by shock or vibration.

Embodiments disclosed herein may include dampeners positioned relative to corners, edges or surfaces of a laptop to dampen shock and vibration before it reaches the base chassis, such that the electronic components are protected from shock and vibration. As used herein, the term dampener may refer to any material affixed to the base chassis for dampening shock or vibration. Dampeners may be affixed to various areas on the chassis. A dampener affixed on a corner may be referred to as a corner dampener. Similarly, a dampener affixed to a side of the chassis may be referred to as a side dampener, a dampener affixed to an edge may be referred to as an edge dampener, a dampener affixed to a surface may be referred to as a surface dampener, and the like. When discussing the dampeners generally, no reference identifiers are used in this disclosure. When referring to a type of dampener, a numeric identifier may be used (e.g. corner dampener 237). When referring to a particular dampener, an alphanumeric identifier may be used (e.g. corner dampener 237a affixed to front right corner of laptop).

Dampening a mobile computer or handheld with a system of dampeners may include a first step of hard mounting all electronic components to a base chassis. After hard mounting the components, the dampening requirements for the computer as a whole may be determined. In some embodiments, determining the dampening requirements for a computer may involve identifying the value of a shock or vibration that, when applied to the chassis, causes failure of the component. For example, the dampening requirement for a laptop computer may be the maximum force that can be applied to the base chassis before the motherboard cracks, the hard drive fails, or the display fails. Identifying the value of a shock may include reviewing data provided by a manufacturer, computer-simulated analyses, or empirically testing the device (e.g., performing a drop test). MIL-STD 810F describes performance standards for one type of drop test, and there may be other standards as well. After identifying a shock that could damage the computer or otherwise render it unavailable for use, areas on the chassis may be identified for positioning of a system to dampen the shock. Identifying the areas may include identifying access doors, vents, ports, or other openings over which a dampener should not be positioned. U.S. patent application Ser. No. 12/204,586 entitled "System, Method and Apparatus for Battery Cooling and Protection," which is hereby incorporated by reference, describes one example of a door over which positioning a dampener may not be desirable. U.S. patent application Ser. No. 12/204,160 entitled "System, Apparatus and Method for Cooling Electronic Components" describes one example of a vent over which positioning a dampener may not be desirable. Identifying areas may include identifying corners, edges and surfaces for which it is desirable to dampen a shock. In some situations, weight of the mobile computer or handheld may be an issue. In theses situations, identifying areas for which it is desirable to position the system may include ensuring the total weight of the computer and the affixed system for dampening shock and vibration does not exceed a desired amount. Thus, although it may be desirable to affix dampeners to the entire chassis, the weight of the computer and dampeners may be such that affixing dampeners to the computer chassis may require affixing dampeners to a portion of the chassis. For example, it may be desirable to provide a laptop computer for use in extreme conditions, but that still weighs less than 9 pounds. If the other computer components weigh 8.5 pounds, a system for dampening the computer must weigh less than 8 ounces but still protect the electronic components inside the chassis.

After areas are identified, dampeners may be affixed to the chassis. Affixing the system to the chassis may involve chemically, mechanically or thermally affixing a material to the areas identified for positioning. Affixing the system to the chassis may involve overmolding a material to the areas identified for positioning. Overmolding is an injection molding process wherein a chassis is positioned in an injection molding machine and a material is injected into the machine to form a dampener onto the chassis. If properly selected, the overmolded material will form a strong bond with the chassis that is maintained in the end-use environment. The use of primers or adhesives may not required to achieve an optimum bond between the overmolded material and the chassis.

Once the material is affixed to desired areas, computer simulation or empirical testing may be used to ensure the dampening system is adequately protecting electronic components in the chassis from shock and vibration.

Figure 1A:
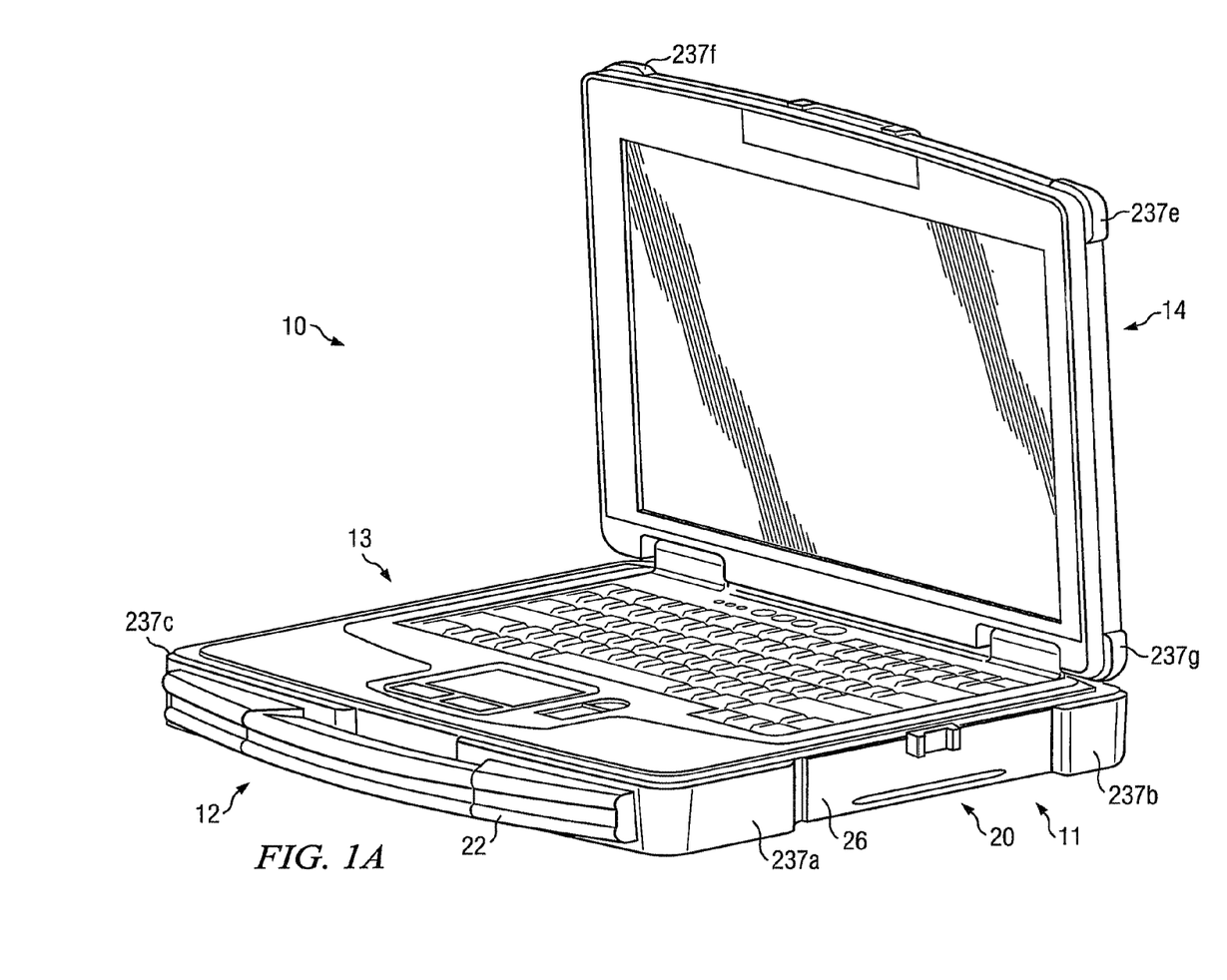
FIGS. 1A-1C depict perspective views of one embodiment of a laptop computer with one embodiment of a system for dampening shock and vibration.
Figure 1B:
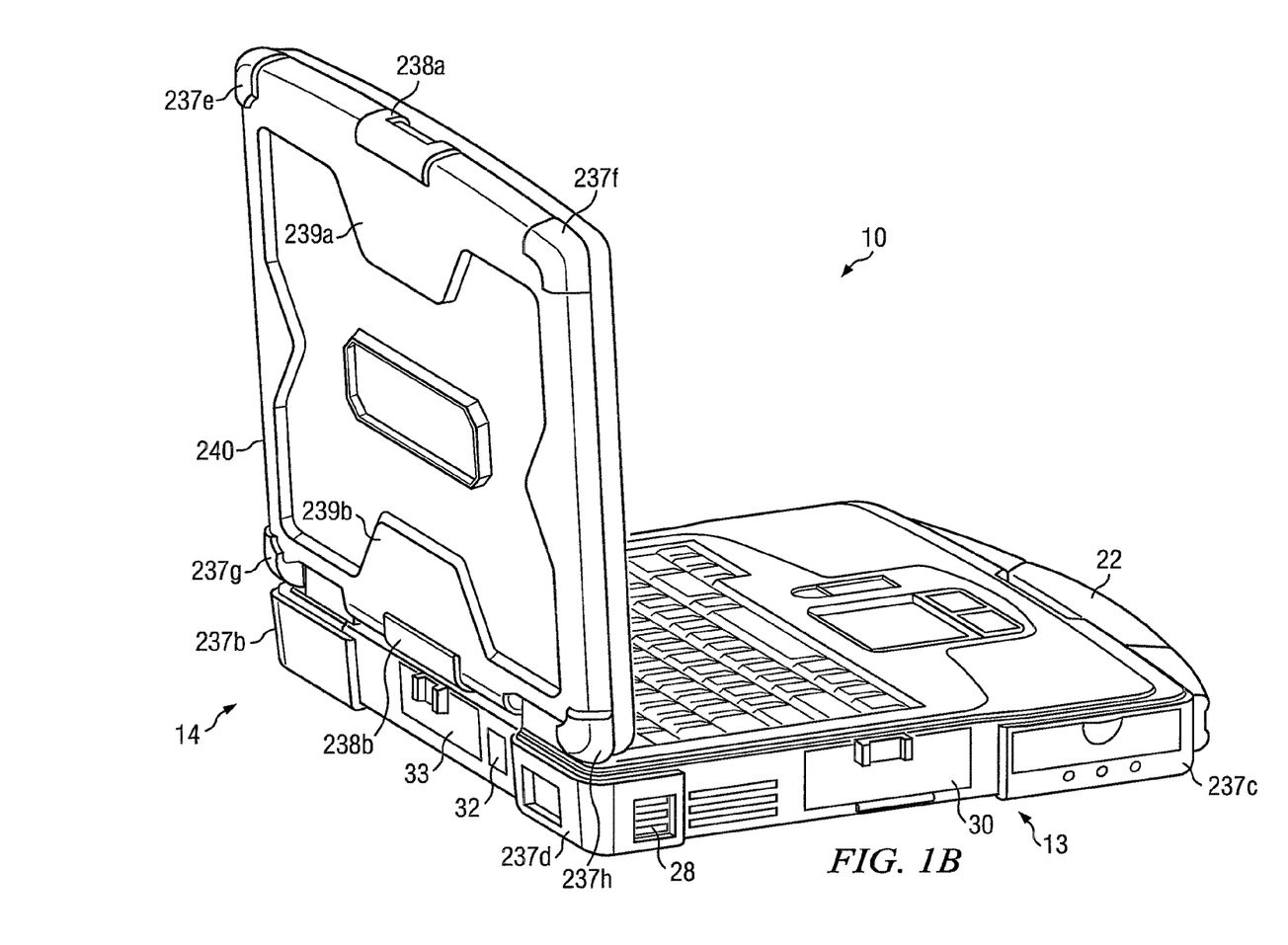
Figure 1C:
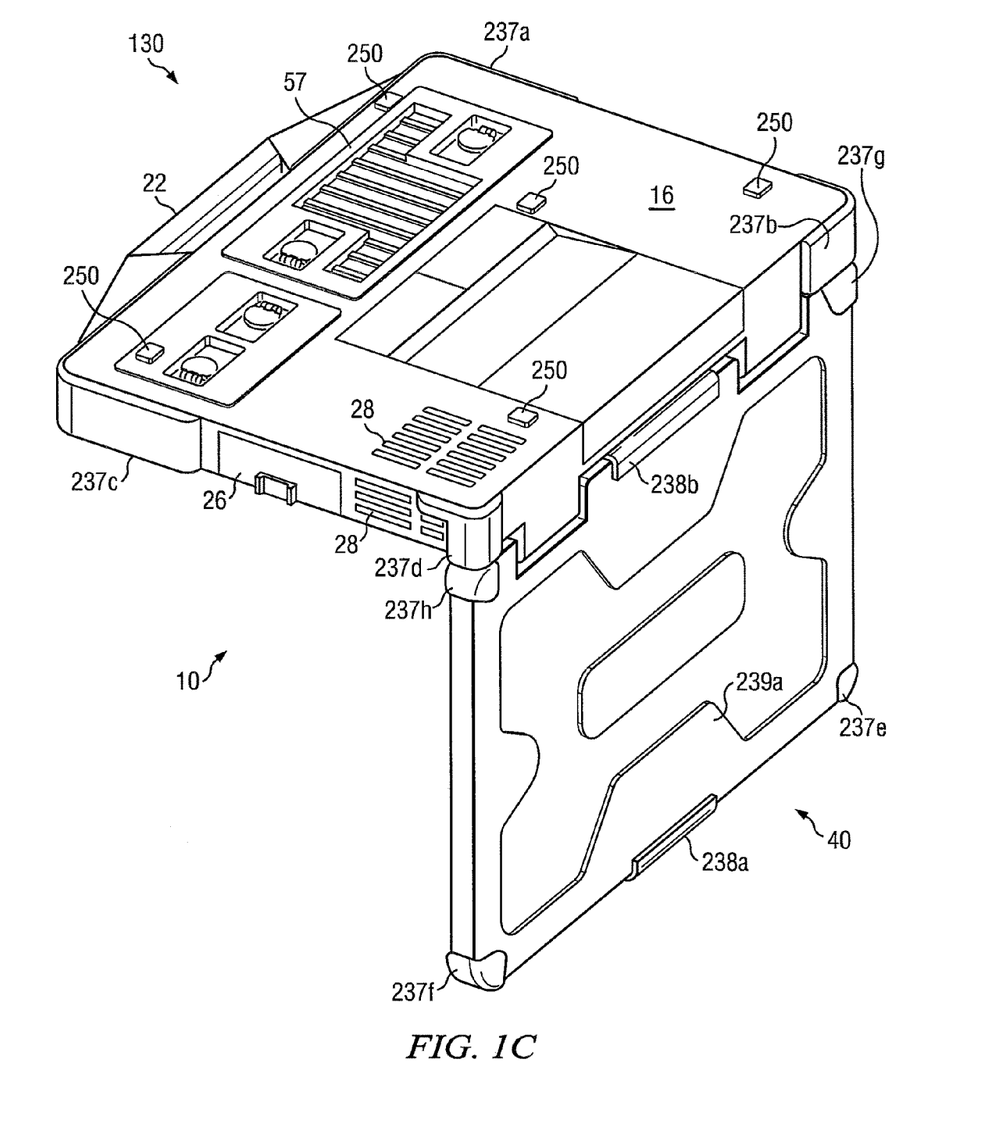

A laptop computer may have a system of dampeners affixed to areas of the chassis to absorb shock and vibration that could damage components in the chassis. FIGS. 1A-1C depict perspective views of one embodiment of laptop computer 10 with one embodiment of system 100 having a plurality of dampeners for dampening shock and vibration. Laptop computer 10, which may include base chassis 20, handle 22, vent 28, I/O door 26, battery access door 57 and electronic components (not shown). DELL Computers, of Round Rock, Tex. is one example of a vendor of laptops 10. Those skilled in the art will appreciate that laptop computer 10 may have other ports, openings, outlets and vents than those depicted in FIGS. 1A-1C and may have components located on different sides, or components may be a different size, or the like, depending on the vendor.

Dampeners may be formed from dampening material affixed to various areas including surfaces, edges or corners of computer 10. As depicted in FIGS. 1A-1C, a portion of one embodiment of system 100 for dampening shock and vibration to components may include corner dampeners 237, side dampeners 238, dampening regions 239, and surface dampeners 240 and 250. Thus, for computer laptop 10 such as depicted in FIGS. 1A-1C, corner dampeners 237, side dampeners 238, dampening regions 239, and surface dampeners 240 and 250 may be affixed to areas of computer 10 to dampen shock based on a value before which a critical component fails. System 100 for dampening shock or vibration to computer 10 may include corner dampener 237a (such as shown in FIG. 1A) affixed to the corner formed by the intersection of side 11 and side 12 to protect computer 10 from shock or vibration associated with impacting computer 10 on the front right corner (e.g., a corner drop). Similarly, system 100 may include corner dampener 237b (such as shown in FIG. 1A) affixed to the corner formed by the intersection of side 11 and side 14 (opposite side 12) to protect computer 10 from shock or vibration associated with impacting computer 10 on the back right corner, corner dampener 237c (such as shown in FIG. 1A) affixed to the corner formed by the intersection of side 12 and side 13 (opposite side 11) to protect computer 10 from shock or vibration associated with impacting computer 10 on the front left corner, corner dampener 237d (such as shown in FIG. 1B) affixed to the corner formed by the intersection of side 13 and side 14 to protect computer 10 from shock or vibration associated with impacting computer 10 on the back left corner, and similarly corner dampeners 237e-h. For purposes of this disclosure, a corner dampener on the lid of the laptop may be formed from two dampeners proximate each other. That is, dampener 237*a* and dampener 237*e* may form a corner dampener when the laptop is closed dampeners 237*c* and 237*f* may form a corner dampener when the laptop is closed, dampeners 237*d* and 237*h* may form a corner dampener when the laptop is closed, and dampeners 237*b* and 237*g* may form a corner dampener when the laptop is closed.

In some embodiments, dampeners may dampen shock and vibration applied to an edge of computer 10. Side dampeners 238 may be affixed to the edges of computer 10 to dampen shock and vibration. For example, FIG. 1C depicts side dampener 238*a* affixed to computer 10 on side 12 and side dampener 238*b* affixed to computer 10 on side 14.

In some embodiments, dampeners may dampen shock and vibration applied to a surface of computer 10. Surface dampeners 240 and 250 may dampen shock and vibration directed to a surface. For example, FIG. 1C shows surface dampeners 250 affixed to computer 10 to dampen shock and vibration directed at surfaces 16.

Dampeners may collectively dampen shock and vibrations to a side or surface of computer 10. For example, corner dampener 237*a* and corner dampener 237*b* may dampen shock applied to side 11 of computer 10.

In some embodiments, areas identified for placement of dampening material may accommodate other features of laptop 10. For example, corner dampeners 237*a* and 237*c* may have a portion disposed between handle 22 and base chassis 20.

Identifying areas for placement of dampening material or system 100 may include identifying areas over which no dampening material may be placed. For example, FIG. 1B depicts an alternate perspective view of the embodiment depicted in FIG. 1A, with laptop 10 including vent 28 for cooling internal components of laptop 10, I/O port 30, power port 32 and communication port 33. Identifying an area for a dampener may include determining that vent 28 cannot be covered and thus corner dampener 237*d* must be configured to not impede air flow into or out of vent 28. U.S. patent application Ser. No. 12/204,160 entitled "System, Apparatus and Method for Cooling Electronic Componets," which is hereby incorporated by reference, describes one example of vent 28.

FIG. 1C depicts an alternate perspective view of the embodiment depicted in FIG. 1A. FIG. 1C shows dampener assembly 130 including corner dampeners 237*a-h*, side dampeners 238*a-b* and dampening regions 239*a-b* affixed to top surface 40 and surface dampeners 250 affixed to bottom surface 16.

Bottom surface 16 may include battery access door 57, vent 28, and other doors or access plates that limit the amount of space on which a dampener may be mounted. In some embodiments, one or more of corner dampeners 237, side dampeners 238, dampening regions 239, and surface dampeners 250 may collectively absorb a shock or vibration applied to bottom surface 16. For example, if computer 10 is dropped onto a flat surface, surface dampeners 250 may absorb a portion of the shock or vibration, and may further compress such that corner dampeners 237 or other dampeners 238 or 239 may absorb a portion of the shock or vibration. Dampeners 250 may also be referred to as "feet."

One or more dampeners 237, 238, 239, 240 or 250 may absorb a shock or vibration applied to computer 10. The material from which dampeners of system 100 are manufactured may absorb a portion of the shock or vibration, may distribute a portion of the shock or vibration over a larger area, or may transfer the shock or vibration into another plane or direction such that components hard mounted in base chassis 20 are not exposed to the full shock or vibration. For example, computer 10 may have system 100 such that, if computer 10 is dropped on bottom surface 16, a portion of the shock is absorbed by feet 250, a portion is absorbed by corner dampeners 237, and a portion is distributed to side dampeners 238 and dampening regions 239.

Figure 2:
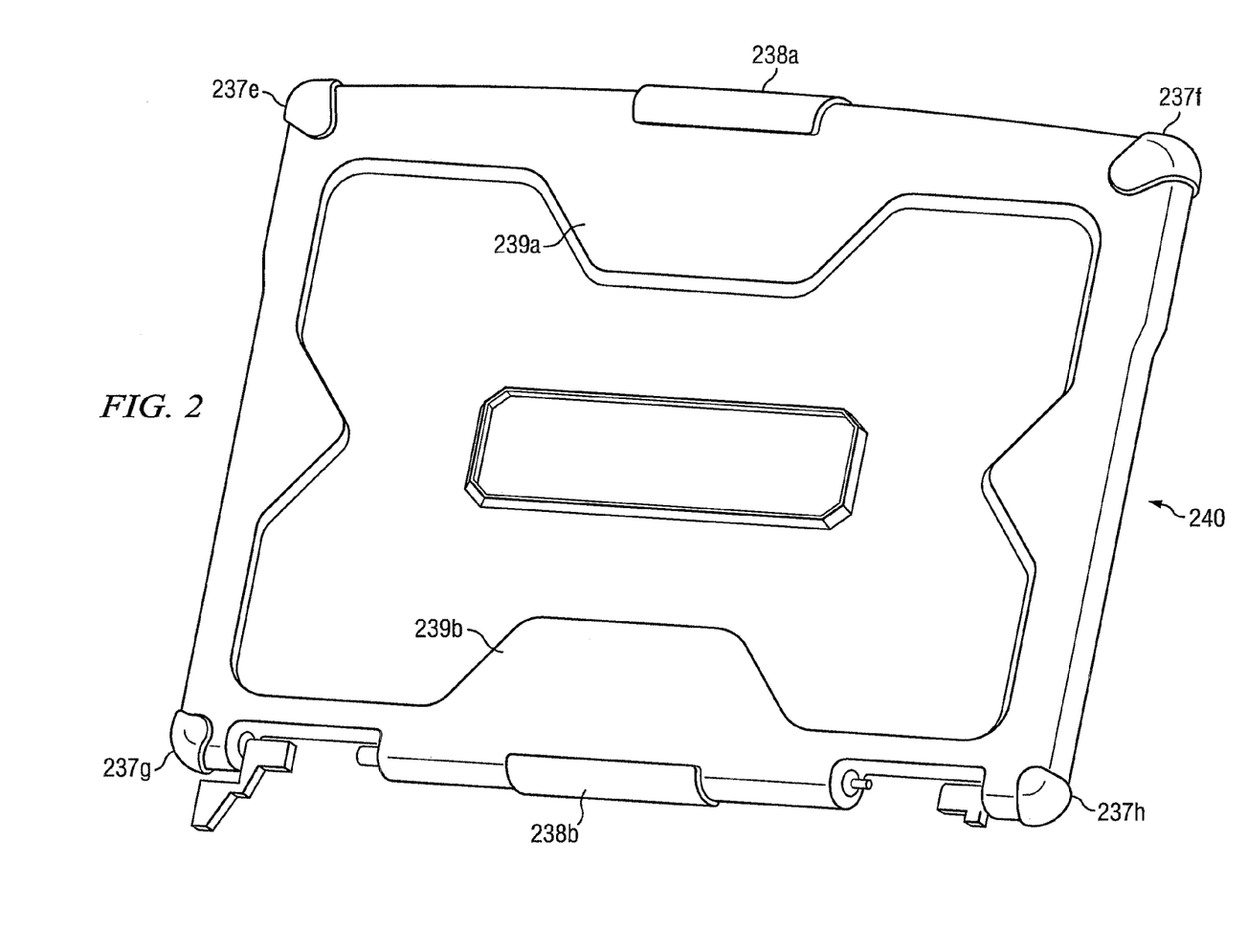
FIG. 2 depicts a perspective view of one embodiment of a portion of a system for dampening shock or vibration to a computer.

FIG. 2 depicts a perspective view of one embodiment of a portion of system 100 for dampening shock or vibration to computer 10. Corner dampeners 237*e-h*, side dampeners 238*a-b* and dampening regions 239*a-b* may be combined into surface dampener 240 to form a portion of system 100 for dampening shock and vibration associated with top surface 40 of laptop computer 10.

Embodiments of dampeners may dampen shock and vibration applied directly thereto. Thus, for example, if computer 10 is dropped on corner dampener 237, corner dampener 237 may dampen the shock or vibration associated with the drop. Combinations of dampeners 237, 238, 239, 240 and 250 may collectively dampen shock or vibration applied to computer 10. So, for example, if computer 10 is dropped on an edge, corner dampeners 237 and side dampeners 238 may collectively dampen the shock or vibration associated with the drop. As another example, if an object is dropped on top surface 40 of computer 10, corner dampeners 237, side dampeners 238, dampening regions 239 and surface dampeners 240 and 250 forming system 100 may collectively dampen the shock or vibration associated with the object contacting top surface 40.

Figure 3:
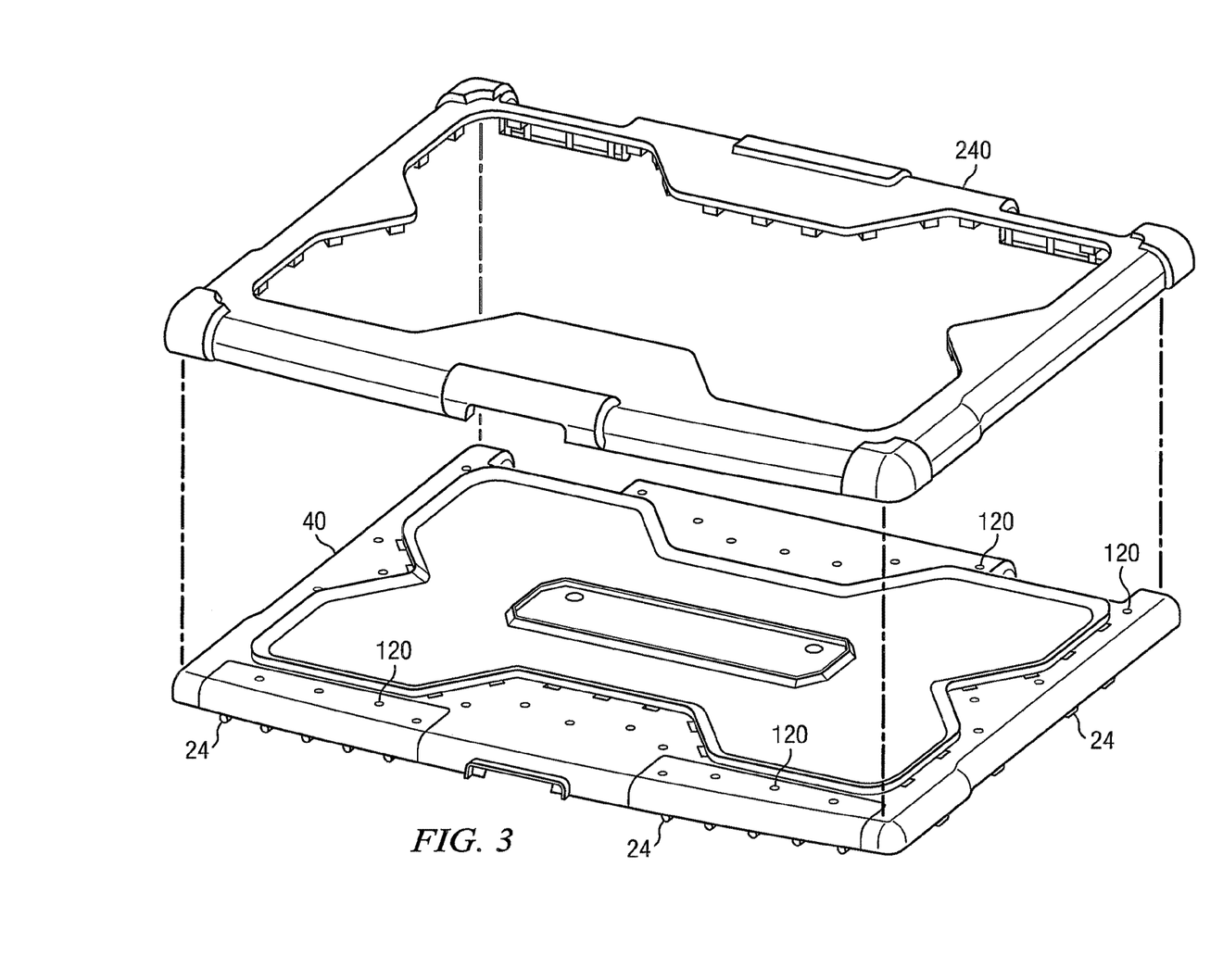
FIG. 3 depicts an exploded view of one embodiment of a portion of a system for dampening shock or vibration associated with a top surface.

Affixing dampeners to computer 10 may involve over-molding the dampening material to chassis 20. FIG. 3A depicts an exploded view of one embodiment of a portion of system 100 for dampening shock or vibration associated with top surface 40. In some embodiments, top surface 40 of laptop computer 10 may be manufactured or machined and include openings 120 at various locations. Top surface 40 of laptop computer 10 may also include cutouts 24 located along the edges of top surface 40.

In some embodiments, top surface 40 having openings 120 and cutouts 24 may be over-molded with material such that a portion of the material enters openings 120 and cutouts 24. As a result of the over-molding process, surface dampener 240 formed from the overmolding process may be affixed to top surface 40.

Overmolding may provide other advantages as well. For example, the use of overmolding eliminates the need for screws or other fasteners to hold dampeners to computer 10. Reducing the number of screws may result in a lower overall weight of laptop 10, a reduction in the number of steps for assembling laptop 10, a reduction in manufacturing costs or reduce the likelihood of material failure near a fastener.

Figure 4:
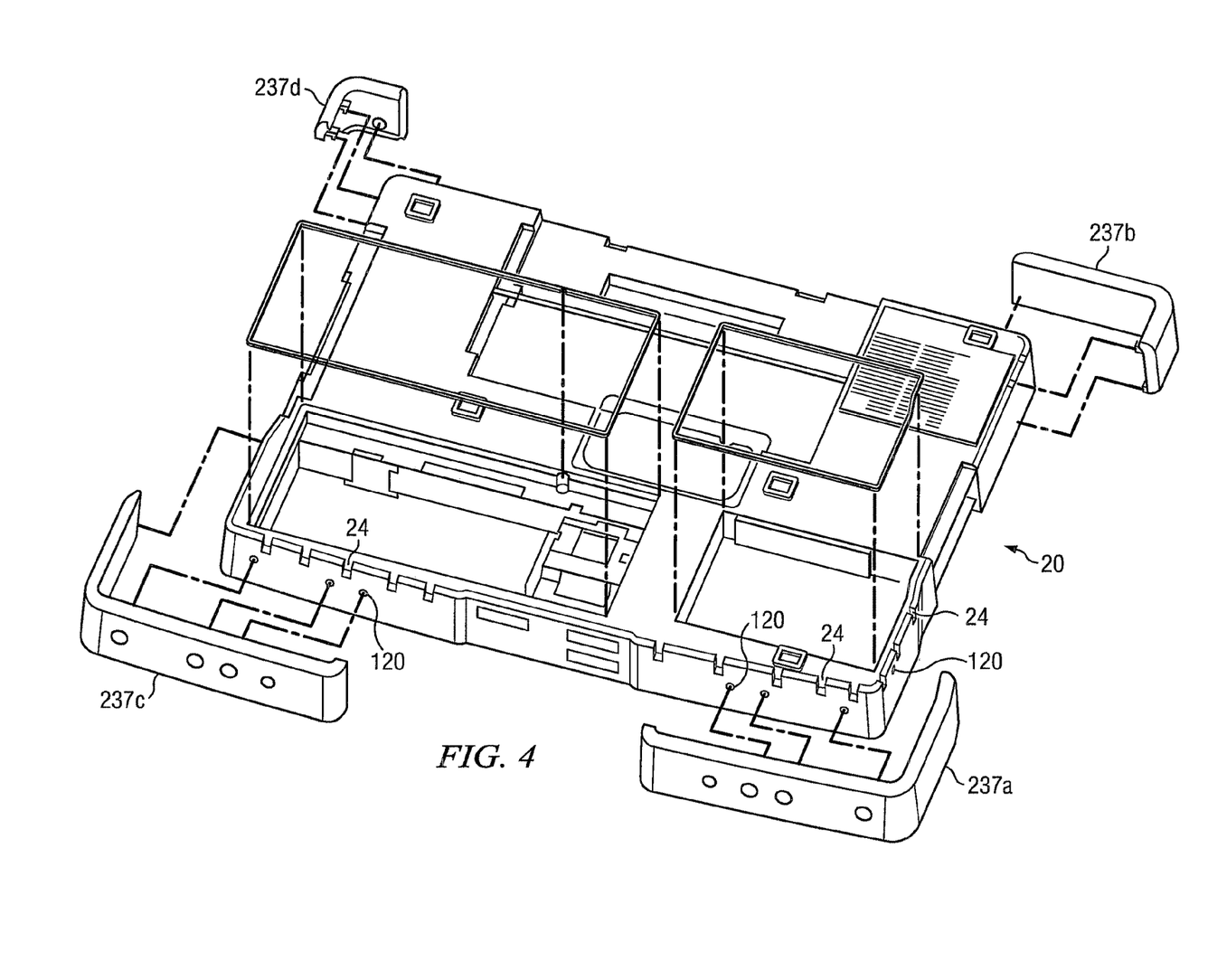
FIG. 4 depicts an exploded view of a base chassis of a computer and corner dampeners.

FIG. 4 depicts an exploded view of base chassis 20 and corner dampeners 237. Base chassis 20 may include openings 120 or cutouts 24 to allow a material to be over-molded to base chassis 20. Base chassis 20 may have openings 120 and cutouts 24 formed therein. Base chassis 20 may then be inserted into an injection molding machine. A material may be injected into a mold such that the material flows through openings 120 and cutouts 24. Once the material is allowed to cool, the material may form dampeners. In one embodiment, the material used to form dampeners is Invision®. Invision is a product of Invision, Sharon Creek, Ohio.

In some situations, sides 11, 12, 13 and 14 may not be continuous surfaces, and dampeners for a side or a corner may not be continuous. For example, side 11 includes an opening for access to one type of media storage device, side 14 includes a vent and side 13 includes a communication port. In some embodiments, the design or shape of a dampener may be affected by the presence of openings, ports, vents, or the like. In some embodiments, a door may be desired for protecting an I/O port, an opening for memory storage device (such as a DVD player), a communication port, a USB port, or some other feature of computer 10. To prevent shock and vibration from reaching base chassis through exposed ports, slots or the like, doors that dampen shock and vibration may be used.

Figure 5A:
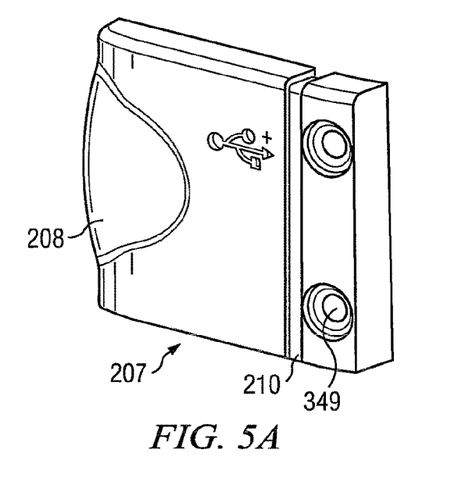
FIGS. 5A and 5B depict perspective views of one embodiment of a door.
Figure 5B:
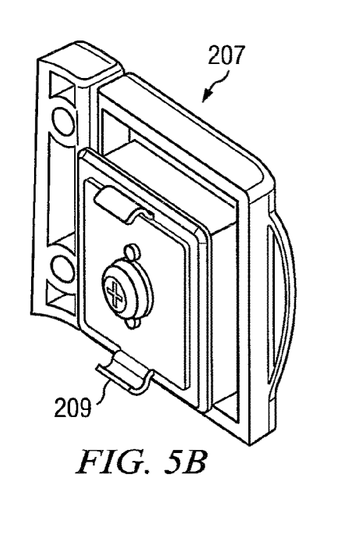

FIGS. 5A and 5B depict perspective views of one embodiment of door 207, which may be useful for covering a USB port. Door 207 may include openings 349 for screws or other mechanical fasteners for securing door 207 to computer 10. Door 207 may further include living hinge 210, door pull 208 or lock 209. In some embodiments, living hinge 210 may be aligned such that door 207 opens in a vertical plane. Door 207 may dampen all or a portion of a shock or vibration applied to door 207. Door 207 may be manufactured from the same material used to manufacture other components of system 100, such as dampeners. In some embodiments, door 207 may be affixed to base chassis 20. In some embodiments, door 207 may be affixed to a dampener.

Figure 6A:
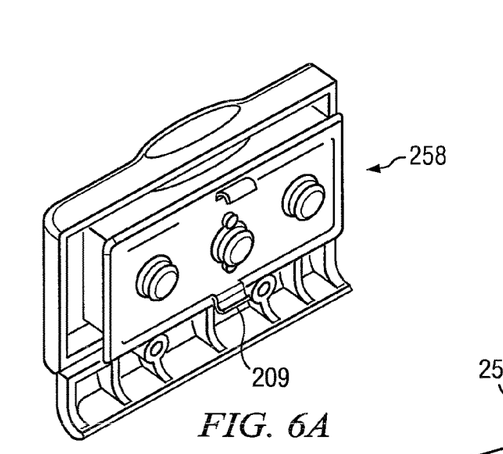
FIGS. 6A and 6B depict perspective views of one embodiment of a door.
Figure 6B:
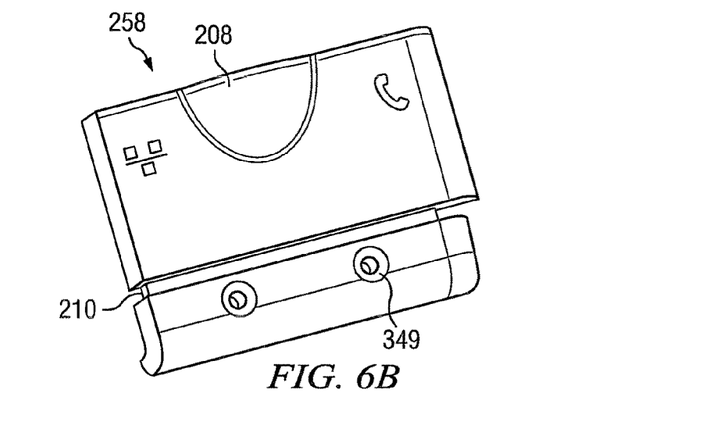

FIGS. 6A and 6B depict perspective views of one embodiment of door 258, which may be useful for covering a RJ45 communication port. Door 258 may be similar to door 207. In some embodiments, door 258 may include living hinge 210, openings 349 for screws or other mechanical fasteners for securing door 258 to base chassis 20, door pull 208 and latch 209. In some embodiments, living hinge 210 may be aligned such that door 258 opens in a vertical plane. Door 258 may dampen all or a portion of a shock or vibration applied to door 258. Door 258 may be manufactured from the same material used to manufacture dampeners of system 100. In some embodiments, door 258 may be affixed to base chassis 20. In some embodiments, door 258 may be affixed to corner dampeners 237.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for protecting electronic components in a computer, comprising:
    machining a plurality of chassis openings and a plurality of lid openings in a computer chassis;
    injection molding a material such that a first portion of the material covers a first outer side surface of a first chassis corner, a second outer side surface of the first chassis corner, and a third outer side surface of the first chassis corner and wherein the first portion of the material partially flows through a first set of the plurality of chassis openings to form a first chassis corner dampener on the first chassis corner;
    injection molding the material such that a second portion of the material covers a first outer side surface of a second chassis corner, a second outer side surface of the second chassis corner, and a third outer side surface of the second chassis corner and wherein the second portion of the material partially flows through a second set of the plurality of chassis openings to form a second chassis corner dampener on the second chassis corner;
    injection molding the material such that a third portion of the material covers a portion of a chassis bottom surface and wherein the third portion of the material partially flows through a third set of the plurality of chassis openings to form a chassis bottom surface dampener on the chassis bottom surface; and
    hard mounting the electronic components of the computer to the computer chassis,
    wherein a size and a position of one or more of the first chassis corner dampener, the second chassis corner dampener and the chassis bottom surface dampener prevents a force from being applied directly to the first chassis corner, the second chassis corner or the chassis bottom surface, and
    wherein each of the first chassis corner dampener, the second chassis corner dampener and the chassis bottom surface dampener are formed with an associated thickness that dampens the force applied to the first chassis corner dampener, the second chassis corner dampener or the chassis bottom surface dampener before the force translates to the computer chassis; and
    wherein the force applied to the first chassis corner dampener, the second chassis corner dampener or the chassis bottom surface dampener is absorbed in, distributed through, or transferred via the material to inhibit propagation of the force to the computer chassis.

2. The method of claim 1, wherein the computer chassis comprises a lid, wherein the method further comprises
    injection molding the material such that a fourth portion of the material covers a first outer side of a first lid corner, a second outer side of the first lid corner, and a third outer side of the first lid corner and wherein the fourth portion of the material partially flows through a first set of the plurality of lid openings to form a first lid corner dampener on the first lid corner,
    wherein the first chassis corner dampener and the first lid corner dampener are proximate each other when the lid is closed to protect the first chassis corner, wherein the first lid corner dampener and the first chassis corner dampener absorb the force applied to the first chassis corner.

3. The method of claim 1, further comprising
    injection molding the material such that a fourth portion of the material covers a first outer side surface of a third chassis corner, a second outer side surface of the third chassis corner, and a third outer side surface of the third chassis corner and wherein the fourth portion of the material partially flows through a fourth set of the plurality of chassis openings to form a third chassis corner dampener on the third chassis corner; and
    injection molding the material such that a fifth portion of the material covers a first outer side surface of a fourth chassis corner, a second outer side surface of the fourth chassis corner, and a third outer side surface of the fourth chassis corner and wherein the fifth portion of the material partially flows through a fifth set of the plurality of chassis openings to form a fourth chassis corner dampener on the fourth chassis corner;
    wherein the first chassis corner dampener, the second chassis corner dampener, the third chassis corner dampener and the fourth chassis corner dampener dampen the force applied to the chassis bottom surface.

4. The method of claim 1, further comprising attaching a door over a port on the first outer side surface of the first chassis corner, wherein the size and position of one or more of the first chassis corner dampener, the second chassis corner dampener and the door absorb the force applied to the first outer side surface of the first chassis corner.

5. The method of claim 1, wherein the material is selected to bond with the computer chassis during the injection molding process.

6. The method of claim 5, the material comprises an elastomer.

7. A shock-dampened computer chassis, comprising:
    an inside comprising points for hard mounting electronic components;
    an outside comprising:
        a top surface having a plurality of top surface openings machined therein;
        a bottom surface opposite the top surface having a plurality of bottom surface openings machined therein; and
        four side surfaces adjacent to the top surface and the bottom surface wherein each side surface of the four side surfaces has a plurality of chassis side surface openings machined therein, wherein a first chassis side surface of the four chassis side surfaces joins a second chassis side surface of the four chassis side surfaces to form a first edge, the first chassis side surface of the four chassis side surfaces and the top surface join to form a second edge, and the second chassis side surface of the four chassis side surfaces and the top surface join to form a third edge, wherein the first edge, the second edge, and the third edge join to form a first chassis corner; and
    a plurality of dampeners, comprising:
        a top surface dampener, wherein a first portion of a material is injection molded into a set of the plurality of top surface openings to form the top surface dampener;
        a bottom surface dampener separate from the top surface dampener, wherein a second portion of the material is injection molded into a set of the plurality of bottom surface openings to form the bottom surface dampener; and
        a first chassis corner dampener, wherein a third portion of the material is injection molded into a first one or more chassis side surface openings from the plurality of chassis side surface openings, a second one or more chassis side surface openings from the plurality of chassis side surface openings, and a first one or more of the plurality of top surface openings and the plurality of bottom surface openings to form the first chassis corner dampener; and
        a second chassis corner dampener, wherein a fourth portion of the material is injection molded into a third one or more chassis side surface openings from the plurality of first chassis side surface openings, a fourth one or more chassis side surface openings from the plurality of chassis side surface openings, and a second one or more of the plurality of top surface openings and the plurality of bottom surface openings to form the second chassis corner dampener,
    wherein a size and a position of one or more of the top surface dampener, the bottom surface dampener, the first chassis corner dampener, and the second chassis corner dampener prevents a force from being applied directly to the first chassis corner, the second chassis corner or the first chassis side surface of the computer chassis, and wherein each of the top surface dampener, the bottom surface dampener, the first chassis corner dampener, and the second chassis corner dampener is formed with an associated thickness, wherein the force applied to one or more of the top surface dampener, the bottom surface dampener, the first chassis corner dampener, and the second chassis corner dampener is dampened before the force translates to the computer chassis.

8. The shock-dampened computer chassis of claim 7, wherein injection molding one or more of the top surface dampener, the bottom surface dampener, the first chassis corner dampener, and the second chassis corner dampener further thermally affixes a portion of the one or more of the top surface dampener, the bottom surface dampener, the first chassis corner dampener, and the second chassis corner dampener to the computer chassis.

9. The shock-dampened computer chassis of claim 8, wherein one or more of the top surface dampener, the bottom surface dampener, the first chassis corner dampener, and the second chassis corner dampener are heat stacked to the computer chassis.

10. The shock-dampened computer chassis of claim 7, wherein injection molding at least one of the first portion of the material, the second portion of the material, the third portion of the material and the fourth portion of the material to form one or more of the top surface dampener, the bottom surface dampener, the first chassis corner dampener, and the second chassis corner dampener mechanically affixes a portion of the one or more of the top surface dampener, the bottom surface dampener, the first chassis corner dampener, and the second chassis corner dampener to the computer chassis.

11. The shock-dampened computer chassis of claim 7, wherein the computer chassis is a laptop computer chassis having a chassis and a lid, further comprising:
    a third chassis corner dampener, wherein a fifth portion of the material is injection molded into a fifth one or more chassis side surface openings from the plurality of second chassis side surface openings and a sixth one or more chassis side surface openings from the plurality of fourth chassis side surface openings, and a sixth portion of the material is injection molded into a set of the plurality of top surface openings, wherein, when the lid of the computer chassis is in a closed position, the fifth portion of the material and the sixth portion of the material are proximate each other to form the third chassis corner dampener.

12. The shock-dampened computer chassis of claim 11, wherein the material comprises an elastomer.

13. A system for protecting components in a laptop computer chassis, comprising:
    a computer chassis having a plurality of chassis openings machined therein;
    a lid having a plurality of lid openings machined therein; and
    a plurality of dampeners, wherein each dampener in the plurality of dampeners is formed by injection molding at least a portion of a material into a set of the plurality of chassis openings or the plurality of lid openings, wherein the plurality of dampeners comprises:
        a top surface dampener formed by injection molding a first portion of the material into a first one or more lid openings in the plurality of lid openings;
        a bottom surface dampener separate from the top surface dampener formed by injection molding a second portion of the material into a first one or more openings in the plurality of chassis openings in a bottom surface; and a first chassis corner dampener formed by injection molding a third portion of the material into a first one or more chassis side surface openings in the plurality of chassis openings in a first chassis side surface and a second one or more chassis side surface openings in the plurality of chassis openings in a second chassis side surface, and injection molding a fourth portion of the material into a second one or more lid openings in the plurality of lid openings, wherein when the lid is closed, the third portion of the material and the fourth portion of the material form the first chassis corner dampener;

a second chassis corner dampener formed by injection molding a fifth portion of the material into a third one or more lid openings in the plurality of lid openings and injection molding a sixth portion of the material into a third one or more chassis side surface openings in the plurality of chassis openings in the first chassis side surface and a fourth one or more chassis side surface openings in the plurality of chassis openings in a third chassis side surface, wherein when the lid is closed, the fifth portion of the material and the sixth portion of the material form the second chassis corner dampener; and a set of points for hard mounting electronic components in the computer chassis, wherein the first chassis corner dampener and the second chassis corner dampener are separate, wherein a size and a position of the top surface dampener, the bottom surface dampener, the first chassis corner dampener and the second chassis corner dampener prevent a force from being applied directly to the first chassis corner, the second chassis corner, the first chassis side surface or the second chassis side surface, and wherein each of the top surface dampener, the bottom surface dampener, the first corner dampener and the second corner dampener are formed from the material with an associated thickness that dampens the force before the force translates to the computer chassis, wherein the material comprises an elastomer.

14. The system of claim 13, further comprising one or more of: injection molding a seventh portion of the material into a fifth one or more chassis side surface openings in the plurality of chassis openings in the first chassis side surface to form a first chassis side surface dampener, injection molding an eighth portion of the material into a sixth one or more chassis side surface openings in the plurality of chassis openings on a fourth chassis side surface, a ninth portion of the material into an seventh one or more chassis side surface openings in the plurality of chassis openings on the third chassis side surface, and a eighth one or more openings in the plurality of chassis openings on the bottom surface to form a third corner dampener, wherein the third chassis corner dampener comprises at least one of a port access opening and a media storage device access opening.

* * * * *